UNITED STATES PATENT OFFICE.

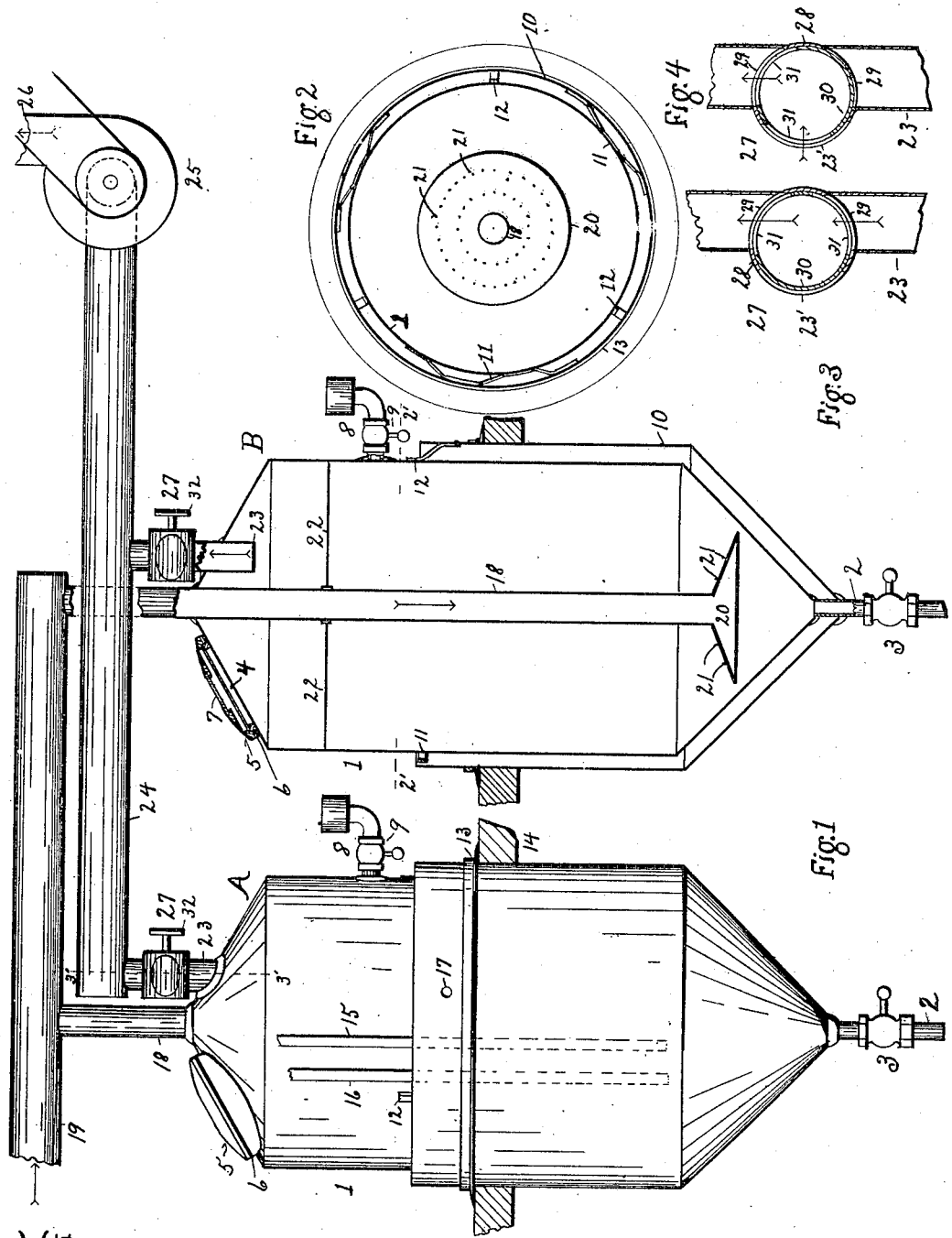

WIGGO F. JENSEN, OF LINCOLN, NEBRASKA.

APPARATUS FOR REFINING BUTTER, OILS, FATS, &c.

No. 837,069.        Specification of Letters Patent.        Patented Nov. 27, 1906.

Application filed August 5, 1905. Serial No. 272,803.

*To all whom it may concern:*

Be it known that I, WIGGO F. JENSEN, a citizen of the United States, and a resident of the city of Lincoln, in the county of Lancaster and State of Nebraska, have invented a new and useful Improvement in Apparatus for Refining Butter, Oils, Fats, Lard, Liquids, and the Like, of which the following is a specification.

The invention relates to the aerator and to the apparatus for separating the objectionable gases from the matter under treatment.

Objects are to improve generally upon apparatus of nature described; to provide an apparatus wherewith the refining may be done in less time than has been possible with apparatus heretofore used for this purpose; to provide an apparatus in which the pure air may be brought directly from the source of supply without passing through a blower; to provide an apparatus from which the impure air may be discharged at any suitable place, as out of doors and out of contact with the matter under treatment; to provide an apparatus in which the matter may be subjected to a vacuum treatment; to provide an apparatus in which the air and gases may be rarefied, so as to increase the tendency of the volatile impurities to volatilize; to provide an apparatus in which the air and gases may be rarefied, so as to increase the volatilization of the volatile impurities and in which a limited supply of pure air may be admitted at the same time.

Other objects will appear hereinafter.

The invention consists of the parts, improvements, and combinations particularly pointed out and claimed herein.

In the drawings accompanying and forming part of this specification and in the description thereof I illustrate the invention in its preferred form and show the best mode of applying the principles thereof; but it is to be understood that the invention itself is not confined to these drawings and the description of the drawings, that it may be applied to other uses, and that parts and combinations thereof as specifically claimed and as separately claimed may be used in connection with other devices of like general nature, and that I contemplate changes in form, proportions, materials, arrangement, the transposition of parts, and the substitution of equivalent members without departing from the spirit of the invention.

In the drawings I have illustrated an apparatus used for refining butter, although the same apparatus is obviously useful for aerating other substances as well.

Figure 1 represents a series of two aerating-tanks connected to a common air-inlet pipe and also connected to a common exhaust-pipe and suction-fan. One of the aerating-tanks A is shown in elevation and the other, B, in vertical central section. Fig. 2 is a sectional plan view of the aerating-tank, taken approximately through the line 2' 2'. Figs. 3 and 4 are sectional views of the air-valve.

Like reference-characters indicate like or corresponding parts throughout the several views.

I first build a suitable tank 1, the bottom of which is tapered down to the outlet-pipe 2, so that the contents of the bottom part thereof may be easily drawn off. Outlet 2 has a valve 3. In the top of the tank is a rather large opening 4, on which is fitted a cover 5, having a glass 7. A washer 6 is provided in order that the cover may be fitted air-tight.

The liquid under treatment may be brought into the can through the inlet-pipe 8, provided with a valve 9.

The lower portion of the main tank is inclosed in a water-jacket 10, to which it may be secured by a number of braces 11 12 and which may be provided with a band 13 and sustained on a suitable support 14. In practice 14 may be the floor between two stories of a building.

15 and 16 are steam and cold-water pipes, respectively, and 17 is the overflow, whereby the temperature of the water in the jacket may be regulated and whereby the temperature of the liquid under treatment in the main can may also be regulated. In treating butter-oil I prefer to maintain a temperature of about 110° Fahrenheit.

18 is an air-inlet pipe connected with the main inlet-pipe 19, which carries the pure air from a suitable source, such as taking it directly from out of doors, care being taken that the opening is located where it will not collect smoke, dust, or other impurities. The pipe 18 extends to the bottom of the can, where it is provided with a diaphragm 20, which has quite a large number of small perforations 21 21, through which the pure air may pass into the liquid in the can. The pipe 18 may be more firmly secured by a number of stay-rods 22 22, connected to the sides of the can.

23 is the exhaust-pipe, leading from the upper or air-chamber portion of the can to the main exhaust-pipe 24, which is connected to the exhaust or suction fan 25, from which the air is discharged, 26, at any suitable point. The discharge may be, and preferably is, out of doors, where the impure air cannot remain in contact with the matter under treatment or pollute the air in the room in which the refining apparatus is installed.

Each pipe 23 may be provided with a valve 27 for regulating the exhaust from the several cans. A simple form of valve is illustrated in the drawings. A cylindrical casing 28 has openings 29 29, registering with the pipe 23, and another opening 23' into the air. Within the casing 28 is a smaller cylinder 30, adapted to be rotated within the outer casing. The inner cylinder has two openings 31 31 and a handle 31 for turning it. In one position openings 31 31 register with openings 29 29, respectively, whereby the air passes from the can to the main exhaust-pipe. In another position the two openings 31 31 register with openings 29 (to exhaust-pipe 24) and 23', thus cutting off the exhaust from the tank. Obviously by turning the handle the draft may be nicely regulated. Thus the upper opening 29 may also be closed by 30, if desired, to cut off the exhaust from one tank without lessening the exhaust from the other tanks, &c.

The discharge-openings 21 21 should bear such relation to the exhaust that the air will not be admitted to the tank too freely. In other words, the purpose of the exhaust or suction fan is to rarefy the air in the tank to an actual and appreciable extent, and obviously this could not be done if the fresh air were admitted too freely.

In treating butter with my improved apparatus the butter is preferably melted and allowed to stand and the solid impurities removed by precipitation and skimming. The butter-oil is then pumped into the tank 1 through the inlet 8. I then prefer to subject the butter-oil to a thorough washing by forcing water at a temperature of about 110° from a nozzle down through the open port 4. I then allow the mixture to stand for a couple of hours and then draw off the water and sediment from the bottom through outlet 2 and valve 3. The butter-oil may, if desired, be again subjected to a washing, standing, and drawing off of the sediment and water as before. The valve 9 is closed, and the cover 5 is put in place, and the tank is now air-tight, except for the inlet and exhaust 18 and 23, respectively. The valve 27 is turned to position shown in Figs. 1 and 3. The exhaust-fan 25 is operated.

Assuming the tank to be only partially—say about half—filled with butter-oil, the effect of the operation of the fan is to rarefy the air in the tank, and thus to reduce the pressure on the liquid itself, and the pure air from the inlet-pipes is forced into the tank by atmospheric pressure and of course passes up through the butter-oil, the perforations 21 21 discharging the air therethrough in small streams.

With former aerators where the aerating has been done by forcing a blast of air under pressure through the liquid the impure air arising from the liquid is allowed to remain about and in the tank, thus contaminating the substance under treatment and polluting the air in the room. Also the compressed air affords small tendency of the volatile impurities to evaporate. By rarefying the air, however, as by the apparatus herein described, I am able to withdraw the impure gases and discharge them wholly away from the tank and room, and I am able to bring in the pure fresh air directly from its source of supply without passing through a blower, and the rarefaction of the air greatly increases the tendency of the volatile impurities to volatilize.

I find in actual practice that where with former devices it has taken eight hours to purify or remove objectionable odors from a quantity of butter-oil I can do the same work with my improved apparatus under exactly similar conditions in about four hours.

To test the contents, the valve 27 should be opened, when the cover 5 may be removed and the presence of objectionable odors detected. When the contents are of the proper sweetness, they may be removed either through the outlet 2 or may be drawn out by a pipe extended down through the port 4 for further treatment.

The interior of the tank is also accessible for cleaning through the port 4.

The tanks may be built of galvanized sheet metal with suitable castings and fittings and should be made air-tight, as well as substantially made, so that the rarefaction of the air within the tank will not cause the tank to "cave" in.

The process involving the use of my improved apparatus is the subject-matter of an application for patent filed by me July 31, 1905, as Serial No. 271,912, which application also discloses but does not claim the apparatus herein shown and claimed.

What I claim is—

1. In apparatus of the kind described, the combination of an air-tight tank having an inverted-cone-shaped bottom, an outlet-pipe at the lowest end and a valve therein; an outlet-pipe leading from the upper part of said tank, and an exhausting device connected with said outlet-pipe; an air-inlet pipe leading down through the top and terminating at the bottom and there having a perforated diaphragm for discharging the inlet-air up through the liquid in the tank; the exhausting device and the inlet-perforations bearing such relation to each other as to cause, during operation of the exhausting device, not only a circulation of the air through the liquid, but also a high and appreciable degree of rarefication in the tank so as to subject the substance therein to a further rarefication to accelerate the volatilization of the volatile substances and at the same time to a continuous blast of expanded pure air.

2. In apparatus of the kind described, the combination of an air-tight tank having a tapered bottom and an outlet-pipe at the lower end and a valve therein; an outlet-pipe leading from the upper part of the tank, and an exhausting device connected therewith; an air-inlet pipe leading down through the tank to the bottom and there terminating in a perforated diaphragm, said perforations being so constricted as to admit, during operation of the exhausting device, only a limited supply of air to the tank; and a glass-covered port in the top of the tank.

In testimony whereof I have hereunto subscribed my name in the presence of witnesses.

WIGGO F. JENSEN.

Witnesses:
   C. T. HAYS,
   A. B. McCLINTOCK.